United States Patent
Ager, Jr.

[15] 3,683,017
[45] Aug. 8, 1972

[54] OXIDATION OF P-XYLENE AND P-TOLUJC ACID TO TEREPHTHALIC ACID

[72] Inventor: John W. Ager, Jr., Princeton, N.J.
[73] Assignee: FMC Corporation, New York, N.Y.
[22] Filed: April 1, 1970
[21] Appl. No.: 24,801

[52] U.S. Cl. .............................. 260/524 R, 252/441
[51] Int. Cl. ................................................ C07c 63/02
[58] Field of Search .................................. 260/524 R

[56] References Cited

UNITED STATES PATENTS

| | | | |
|---|---|---|---|
| 2,853,514 | 9/1958 | Brill | 260/524 |
| 2,833,816 | 5/1958 | Saffer et al. | 260/524 |

FOREIGN PATENTS OR APPLICATIONS

| | | | |
|---|---|---|---|
| 841,244 | 7/1960 | Great Britain | 260/524 |

*Primary Examiner*—Lewis Gotts
*Assistant Examiner*—R. S. Weissberg
*Attorney*—Robert D. Jackson and Milton Zucker

[57] ABSTRACT

Terephthalic acid (TPA) is prepared by oxidizing p-xylene, p-toluic acid (PTA) or a mixture of the two, by reaction under pressure of at least 50 psig and at temperatures of about 140° to 250° C., carrying out the reaction in glacial acetic acid as the reaction medium, and using as catalyst cobalt chloride alone, or preferably a combination of cobalt or nickel with chromium and manganese salts, activated by chloride ion. Tungsten is an optional ingredient of the catalyst.

4 Claims, No Drawings

OXIDATION OF P-XYLENE AND P-TOLUIC ACID TO TEREPHTHALIC ACID

BACKGROUND OF THE INVENTION

The oxidation of p-xylene to TPA has been extensively studied in the past two decades, due principally to the growing use of TPA in the manufacturing of polyesters for use in the production of fibers and films. Direct oxidation with elemental oxygen, either concentrated or diluted as in air, has been extensively investigated. Elevated temperature and pressure, and an effective catalyst system, are essential for successful oxidation.

One such system is described in Saffer et al. U.S. Pat. No. 2,833,816 issued May 6, 1958. He uses a combination of bromine and a metal, in particular manganese, cobalt, nickel, chromium, vanadium, molybdenum, tungsten, tin and cerium. The principal disadvantage of this process is that the bromine is expensive, very difficult to handle, and presents very grave disposal problems with plant effluent streams.

A replacement for bromine in this oxidation is suggested in Brill U.S. Pat. No. 2,853,514 issued Sept. 23, 1959. He uses an alkyl ketone such as methyl ethyl ketone or an aldehyde like acetaldehyde, as activator for the metal. The principal difficulty with this approach is cost; rather large amounts of the activator are consumed in the reaction, and are not recovered, so they represent a substantial element of cost.

OBJECT OF THE INVENTION

This invention aims to produce TPA with heavy metal catalysts using very inexpensive activators which are not consumed in the reaction, and which do not produce excessive handling and waste-disposal problems.

STATEMENT OF THE INVENTION

In accordance with this invention, p-xylene, p-toluic acid (PTA) and mixtures thereof are oxidized to terephthalic acid (TPA) with elemental oxygen, in solution in acetic acid, under pressures of at least about 50 pounds per square inch gage (psig) and at temperatures of about 140° to 250° C. in the presence of a heavy metal salt catalyst selected from the group consisting of (1) cobalt chloride alone or (2) most preferably mixtures of cobalt and/or nickel salts with manganese and chromium salts, with a tungsten compound as an optional additive; and (3) as activator, chloride ion in a molar ratio to p-xylene plus p-toluic acid of at least 1 to 10.

DETAILED DESCRIPTION OF THE INVENTION

In practicing the invention, the process may be run batchwise or continuously. The reactants — p-xylene and/or PTA — are dissolved in glacial acetic acid, and the catalyst and activator are dissolved or suspended in this same carrier; oxygen is then added as needed to the desired pressure, and the temperature raised to effect reaction.

In general, about 5 to 25 moles of glacial acetic acid are used per mole of p-xylene or PTA, but the amounts used are not critical — it is only necessary to use enough acid to be effective as a medium, and not so much that the reaction medium is so diluted as to make recovery of product expensive.

The catalyst may be cobalt chloride alone, which is soluble in glacial acetic acid. It is preferably a mixture of cobalt and/or nickel salt chromium and manganese salts, with or without a tungsten compound. It is desirable that when large concentrations of catalyst are used, they be chlorides, since the chloride ion acts as an activator for these catalysts. Where cobalt chloride alone is used, about 5 to 20 mole percent is used based on material to be oxidized; the other catalytic metals are used in molar concentrations of about 1.0 percent to as low as 0.01 percent of that of the material to be oxidized, but they are not as effective as cobalt chloride in oxidizing p-xylene not admixed with PTA.

The catalyst is activated with a chloride which is soluble in the glacial acetic acid. With cobalt chloride, there is sufficient chloride present so no additional chlorine ion is needed. With the other materials, it is essential to have at least 1 mole of chlorine present for each 10 moles of p-xylene plus PTA.

The reaction pressures needed are not high. As little as about 50 psig will give good results; pressures in excess of 1,000 psig can be used, but are uneconomic. Reaction pressures are measured at room temperature, before heating.

Temperatures may be varied from about 140° C. to about 250° C. Below 140° C., reaction times are slow; above 250° C. side reactions occur.

Depending on reaction conditions, the reaction is substantially complete in from about 10 minutes to several hours; times are selected to give the desired degree of conversion.

EXAMPLES OF THE INVENTION

The following examples are given by way of illustration and not by way of limitation.

EXAMPLE 1

A mixture of PTA (6.9 g; 0.05 m), p-xylene (2.6 g; 0.024 m), acetic acid (25 g; 0.42 m) and cobalt chloride (0.5 g; $4.2 \times 10^{-3}$ m) was put in a titanium autoclave and pressured to 300 psig with oxygen. The mixture was heated at 170° for 1 hour. After cooling, the contents were analyzed. The conversion of xylene was 100 percent; the conversion of PTA was 81 percent; the corrected yield of TPA was 80 percent.

EXAMPLE 2

A mixture of PTA (6.9 g; 0.05 m), p-xylene (2.6 g; 0.024 m), acetic acid (25 g; 0.42 m), ammonium chloride (0.5 g; 0.094 m) and cobalt chloride (0.5 g; $4.2 \times 10^{-3}$ m) was put in a titanium autoclave and pressured to 300 psig with oxygen. The mixture was heated to 160°. There was a reaction and the temperature rose to 200° for one-half hour. Analysis of the products showed: 100 percent conversion of xylene; 81 percent conversion of PTA; 85 percent corrected yield of TPA.

EXAMPLE 3

The previous experiment was repeated, using 0.3 g ($2.5 \times 10^{-3}$ m) of cobalt chloride instead of 0.5 g. The temperature was 170° for one-half hour. The results were: 100 percent conversion of xylene; 95 percent conversion of PTA; 81.5 percent corrected yield of TPA.

EXAMPLE 4

A mixture of PTA (6.9 g; 0.05 m), p-xylene (0.43 g; 0.004 m), acetic acid (25 g; 0.42 m), ammonium chloride (1.0 g; 0.019 m), manganous acetate (0.06 g; $3.5 \times 10^{-4}$ m), chromium trichloride (0.06 g; $3.8 \times 10^{-4}$ m), nickel chloride (0.001 g; $7.7 \times 10^{-6}$ m) and tungsten trioxide (0.01 g; $4.3 \times 10^{-5}$ m) was placed in a 300 ml titanium autocalve, pressured to 300 psig with oxygen and heated to 195° with rocking. There was a reaction and the temperature rose to 235°. After cooling, the pressure was 175 psig. The conversion of PTA and xylene was 100 percent. The yield of TPA was 84 percent.

EXAMPLE 5

A mixture of PTA (6.9 g; 0.05 m), p-xylene (2.6 g; 0.024 m), acetic acid (25 g; 0.42 m), ammonium chloride (1.0 g; 0.019 m), manganous acetate (0.06 g; $3.5 \times 10^{-4}$ m), chromium trichloride (0.06 g; $3.8 \times 10^{-4}$ m), and nickel chloride (0.001 g; $7.7 \times 10^{-6}$ m) was pressured to 300 psig with oxygen in a titanium autoclave and heated to 160°–200° for one-half hour. The results were: 100 percent conversion of xylene; 95 percent conversion of PTA; 80 percent corrected yield of TPA.

EXAMPLE 6

A mixture of PTA (6.9 g; 0.05 m), acetic acid (25 g; 0.42 m), water (2 g; 0.11 m), lithium chloride (5.0 g; 0.12 m), manganous acetate (0.06 g; $3.5 \times 10^{-4}$ m), chromium trichloride (0.06 g; $3.8 \times 10^{-4}$ m), nickel chloride (0.06 g; $4.6 \times 10^{-4}$ m), and tungsten trioxide (0.01 g; $4.3 \times 10^{-5}$ m) was pressured to 300 psig with oxygen in a titanium autoclave and heated to 200° for one-half hour. The results were: 100 percent conversion of PTA; 70 percent yield of TPA.

EXAMPLE 7

A mixture of PTA (6.9 g; 0.05 m), p-xylene (2.6 g; 0.024 m), acetic acid (25 g; 0.42 m), ammonium chloride (0.5 g; 0.0094 m), cobalt chloride (0.5 g; $4.2 \times 10^{-3}$ m), manganous acetate (0.06 g; $3.5 \times 10^{-4}$ m), chromium trichloride (0.06 g; $3.8 \times 10^{-4}$ m), nickel chloride (0.001 g; $7.7 \times 10^{-6}$ m), and tungsten trioxide (0.01 g; $4.3 \times 10^{-5}$ m) was pressured to 500 psig with oxygen and heated at 180°. The results were: 100 percent conversion of PTA; 100 percent conversion of xylene; 88.5 percent yield of TPA.

EXAMPLE 8

A mixture of PTA (6.9 g; 0.05 m), p-xylene (2.6 g; 0.024 m), acetic acid (25 g; 0.42 m), ammonium chloride (1 g; 0.019 m), cobalt chloride (0.5 g; $4.2 \times 10^{-3}$ m), manganous acetate (0.06 g; $3.5 \times 10^{-4}$ m), chromium trichloride (0.06 g; $3.8 \times 10^{-4}$ m), nickel chloride (0.001 g; $7.7 \times 10^{-6}$ m), and tungsten trioxide (0.01 g; $4.3 \times 10^{-5}$ m) was put in a 300 ml titanium autoclave and pressured to 300 psig with oxygen. The mixture was heated to 175°. There was a reaction and the temperature rose to 240°. After cooling, the pressure was 120 psig. The conversion of PTA and xylene was 100 percent. The yield of TPA was 85 percent.

EXAMPLE 9

A mixture of PTA (6.9 g; 0.05 m), acetic acid (25 g; 0.42 m), ammonium chloride (0.5 g; 0.0094 m), cobalt chloride (0.5 g; $4.2 \times 10^{-3}$ m), manganous acetate (0.06 g; $3.5 \times 10^{-4}$ m) and chromium trichloride (0.06 g; $3.8 \times 10^{-4}$ m) was put in a 300 ml titanium autoclave and heated at 180° for one-half hour. After cooling, the pressure was 175 psig. The conversion of PTA was 100 percent. The yield of TPA was 93 percent.

Obviously, the examples can be multiplied indefinitely without departing from the scope of the invention as defined in the claims.

I claim:

1. The method of producing terephthalic acid which comprises heating an acetic acid solution of a compound selected from the group consisting of p-toluic acid and p-xylene and mixtures thereof with elemental oxygen at temperatures of 140° to 250° C. and at pressures of at least 50 psig in the presence of a catalyst containing at least 1 mole of chlorine for each 10 moles of p-toluic acid plus p-xylene present, and containing also a catalyst selected from the group consisting of a salt of cobalt alone and mixtures of cobalt salts and/or nickel salts with manganese and chromium salts, there being present at least 2 moles of chlorine for each mole of cobalt, and no bromine.

2. The method of claim 1, in which the catalyst is cobalt alone, in a ratio of 5 to 20 mole percent of the p-toluic acid plus p-xylene present.

3. The method of claim 1, in which the catalyst is a mixture of cobalt and/or nickel, with manganese and chromium, the molar concentration of cobalt where used to 5 to 20 percent, and the molar concentration of the other metals used is between 0.01 and 1 percent, based on p-toluic acid plus p-xylene.

4. The method of claim 3, in which the catalyst also contains tungsten.

* * * * *

UNITED STATES PATENT OFFICE
CERTIFICATE OF CORRECTION

Patent No. 3,683,017        Dated August 8, 1972

Inventor(s) John W. Ager, Jr.

It is certified that error appears in the above-identified patent and that said Letters Patent are hereby corrected as shown below:

Column 2, line 64 "(2,5 X $10^-$m)" should read --(2.5 X $10^{-3}$m)--.

Column 4, line 46 "to" should read --is--.

Signed and sealed this 30th day of January 1973.

(SEAL)
Attest:

EDWARD M. FLETCHER, JR.         ROBERT GOTTSCHALK
Attesting Officer                Commissioner of Patents